3,106,443
ANTI-BLEMISH PAINT COMPOSITIONS AND METHOD OF APPLYING THEM TO THE SURFACES OF UNCURED RUBBER ARTICLES
George R. Cuthbertson, Ridgewood, N.J., and Ernest B. Dodge, Detroit, Mich., assignors to United States Rubber Company, New York, N.Y., a corporation of New Jersey
No Drawing. Filed Sept. 9, 1960, Ser. No. 54,830
9 Claims. (Cl. 18—53)

This invention relates to improved anti-blemish paint compositions for application to the surfaces of uncured rubber articles prior to the introduction of such articles into curing molds.

Anti-blemish paints have been used in the tire industry for many years to reduce the defects resulting from entrapment of air during tire molding operations. In the absence of such anti-blemish paints, it was found that, when a raw tire carcass was shaped into the complex shape of a finished tire, air was trapped in localized areas between the surface of the raw tire and the mold. Some of this trapped air is not effectively dissolved or expelled during the molding operation, and prevents the portions of the tire under the air pockets from contacting the mold and undergoing a normal cure. This results in a tire with different degrees of curing and with visible unsightly defects. This problem is particularly pronounced in the sidewalls of the tires. Although improved methods of constructing molds equipped with air vents are in use, the problem has not been overcome. In order to alleviate the problem of air entrapment, it is common in the tire industry to paint the surface of a raw, uncured, unshaped tire with an anti-blemish paint. Conventionally, an anti-blemish paint comprises natural rubber, which is compounded with a large amount of a coarse pigment and a relatively large amount of a fatty acid or fatty acid soap.

Although the use of anti-blemish paints has reduced the number of tires which are rejected because of mold defects, such use has not entirely overcome the problem of mold defects, and has additionally given rise to other problems. Thus, it has been found that the use of prior art anti-blemish paints results in "folds" in the sidewall area of the tires, which folds may and do open when the tire is subjected to continuous flexing in road driving and cause early tire failures; moreover, these folds are always unsightly. Additionally, it has been found that the use of prior art anti-blemish paints causes the easy incidence of ozone cracking, this defect probably being due to the extremely high strain distortions which are set up in the rubber phase of the anti-blemish paint film as a result of the high pigment-to-rubber ratio which must be used in the paint.

It is therefore an object of this invention to provide anti-blemish paints which, when applied to uncured rubber articles, eliminate air pockets between molds and such articles placed therein, and which additionally do not impair resistance to ozone cracking and enhance ability to resist failure through repeated flexing.

It is an additional object of this invention to provide improved anti-blemish paints by utilizing synthetic cis-polyisoprene as the elastomeric vehicle therein.

According to this invention, it has been discovered that anti-blemish paints having enhanced properties are obtained by dispersing in a petroleum solvent an elastomeric composition comprising cis-polyisoprene as an essential ingredient, wherein the cis-polyisoprene contains from about 85% to about 97% of isoprene radicals joined in a cis-configuration. Moreover, according to this invention, a method of molding tires having sidewalls with unimpaired ozone resistance and enhanced resistance to flexing failures has been discovered which comprises applying the described anti-blemish paint containing cis-polyisoprene to a raw tire carcass over the area which forms the sidewalls of the molded tire, and molding said raw tire carcass to form a cured tire.

The use of synthetic cis-polyisoprene in an anti-blemish paint composition demonstrates marked improvements over the similar use of natural rubber. Thus, when an anti-blemish paint composition containing natural rubber was applied to raw tire carcasses, it was found by factory inspection over a long period of time that a total of 10–13% of cured tires which were marred by blisters and folds was produced. However, when the synthetic cis-polyisoprene anti-blemish paint of this invention was substituted for that containing natural rubber, the incidence of tires showing folds and blisters was reduced to 2.4–4%. In other words, the use of the cis-polyisoprene anti-blemish paint reduced the number of reject tires to less than one-third of the number obtained when a natural rubber anti-blemish paint was used.

The anti-blemish paints of this invention are compounded according to conventional prior art techniques. Generally, the cis-polyisoprene is mixed with a filler, usually a reinforcing carbon black, and other compounding ingredients in a conventional Banbury mixer. The resultant elastomeric component, suitably containing from about 75 to about 80 parts of synthetic cis-polyisoprene, is then dispersed in a petroleum solvent, together with a coarse pigment, such as lamp black, and a fatty acid or a fatty acid soap. A typical formulation follows:

| | Parts by weight |
|---|---|
| Compounded cis-polyisoprene | 100 |
| Coarse filler | 100–500 |
| Fatty acid or fatty acid soap | 20–500 |

The above components are dispersed in sufficient petroleum solvent to produce a paint having a jelly-like consistency. The consistency is not critical, but, for ease of application and the best results in the finished tire, the indicated consistency is most satisfactory. The petroleum solvent should be predominantly aliphatic in character. The volatility characteristics should be equivalent or similar to those of gasoline. Petroleum solvents which are commercially designated as rubber solvent grade, V. M. & P. naphtha, and mineral spirits are suitable for use in the compositions of this invention. Preferred ranges for the coarse filler in the above formulation and for the fatty acid or fatty acid soap in the above formulation are 200–300 and 20–50 parts by weight, respectively. The preferred amount of petroleum solvent for use in dispersing the above formulation is from about 1800 to about 2500 parts by weight.

The synthetic cis-polyisoprene, which is used as the essential ingredient in the anti-blemish paints of this invention, is produced by known techniques. It is believed that the cis-polyisoprene should have from about 85% to about 97% content of isoprene radicals joined in a cis-configuration, and preferably 90–95%, and an intrinsic viscosity of from about 5.0 to about 10.0. It has been found that such a cis-polyisoprene is characterized by having a low shear viscosity.

The filler ingredient used as one component of the anti-blemish paint is preferably lamp black. Other fillers and pigments, such as zinc oxide, lithopone, whiting, barytes, magnesium carbonate, magnesium oxide, mica, talc, titanium oxide and clays, are also suitable. Generally, the filler is of a coarse particle size equivalent to that of lamp black since the function of this ingredient is to provide air egress passageways on the surface of the article being cured in the mold, but the exact degree of coarseness is not critical.

Any one of a number of substantially nonwater soluble fatty acids or fatty acid soaps may be used to facilitate the dispersion of the cis-polyisoprene and filler in the petroleum solvent. Examples of such materials include stearic acid, sebacic acid, palmitic acid, lauric acid, zinc stearate and lead oleate.

The reason for the extreme effectiveness of our cis-polyisoprene anti-blemish paint is not known. While we do not wish to limit this invention or to be bound by our theory, it is supposed that synthetic cis-polyisoprene demonstrates marked superiority to natural rubber in anti-blemish paint for the following reason. Natural rubber as received from the plantations is a high molecular weight, elastomeric polymer having an extremely high shear viscosity as exemplified, for instance, in the standard Mooney viscometer. Because of this high shear viscosity and elastic memory, natural rubber requires extensive plastication to permit easy fabrication into shapes suitable for fabrication into manufactured articles. This plastication is assumed to involve a diminution of both molecular weight and shear viscosity. Synthetic cis-polyisoprene, on the other hand, prepared by polymerization of isoprene to a cis content of 85–97% and an intrinsic viscosity of 5.0 to 10.0, is characterized by an extremely low shear viscosity. It is presumed that, when natural rubber is replaced with synthetic cis-polyisoprene in the anti-blemish paint, the low shear viscosity of the synthetic polyisoprene permits extreme attenuation of the anti-blemish paint film without rupture of the film, and that the cis-polyisoprene anti-blemish paint film, when it is occluded within a fold, permits easy and firm knitting of the fold during the curing operation, and renders it less liable to separation on repeated flexing.

The following examples are given to exemplify without limitation the novel anti-blemish paints of this invention. All parts are by weight.

EXAMPLE 1

Synthetic cis-polyisoprene, having the characteristics prescribed above, was compounded with carbon black and other ingredients to form the elastomeric component of the anti-blemish paint according to the following formulation:

*Elastomeric Component*

| | Parts |
|---|---|
| Synthetic cis-polyisoprene | 100 |
| Reinforcing carbon black | 22½ |
| Sulfur | 3½ |
| Mercaptobenzothiazole | 1 |
| Antioxidant (low temperature reaction product of diphenylamine and acetone) | 1 |
| Pine tar | 3 |

The compounding of the elastomeric component is achieved by mixing the above formulation in a conventional Banbury mixer.

The anti-blemish paint was formulated as follows:

*Anti-Blemish Paint*

| | | |
|---|---|---|
| Elastomeric component | lbs. | 50 |
| Gasoline | gals. | 180 |
| Stearic acid | lbs. | 15 |
| Lamp black | lbs. | 140 |

The anti-blemish paint was prepared by first dissolving the elastomeric component in the gasoline in a conventional cement churn, and thereafter the indicated quantities of melted stearic acid and lamp black were added to the churn to make a total of about 200 gallons of anti-blemish paint.

EXAMPLE 2

A calendered sheet of a typical rubber stock used in tire sidewalls was subjected to repeated knife-cuts, forming two parallel sets of lines in a cross-hatch pattern on one surface of the sheet of rubber. The depth of the cuts was on the order of 1 mm. Half of the surface of the lacerated calendered sheet was painted with a natural rubber anti-blemish paint compounded according to the formulation and technique described in Example 1, except for the substitution of natural rubber for the synthetic cis-polyisoprene. The remaining half of the sheet was painted with the synthetic cis-polyisoprene anti-blemish paint of Example 1. The calendered sheet was then placed in a mold and vulcanized in a platen press. On removal from the mold, the cross-hatch pattern was still evident in that portion of the sample which had been painted with natural rubber anti-blemish paint, but was indiscernible in the remaining portion which had been painted with synthetic cis-polyisoprene anti-blemish paint.

The appearance of these samples is a striking demonstration of the effectiveness of cis-polyisoprene as a component in anti-blemish paint. It is presumed that, during molding of the piece, the natural rubber anti-blemish paint is attenuated and ruptured in the near vicinity of the cuts, so that the resultant striations are clearly visible in the cured piece; whereas, in the case of the cis-polyisoprene paint film, no rupturing occurs under identical circumstances and the desirable unmarred appearance of the rubber surface is attained.

A similar comparison coated sheet was prepared without the cross-hatched knife cuts, and was cured as above. The cured sheet was subjected to the dynamic exposure to ozone test (A.S.T.M. procedure) and the portion coated with the synthetic cis-polyisoprene paint was found to be definitely more resistant to ozone than was the natural rubber paint coated portion. This improvement is a significant factor in the increased road life of tires treated with the anti-blemish paint of this invention.

The paint of this invention is desirably used for the surface protection of any of the more highly unsaturated rubbers. Examples of such rubbers currently used to the greatest extent in tire carcasses are natural rubber, SBR, high-styrene SBR, polyisoprene, polybutadiene and reclaimed rubber.

Although the use of the anti-blemish paints of this invention has been illustrated particularly in reference to tire construction, such compositions can be used wherever air pockets tend to form between a mold and a rubber article being molded therein.

Having thus described our invention, what we claim and desire to protect by Letters Patent is:

1. An anti-blemish paint comprising 100 parts by weight of an elastomeric composition having, as its major constituent, synthetic cis-polyisoprene having from about 85% to about 97% content of isoprene radicals joined in a cis-configuration, from about 100 to about 500 parts by weight of a coarse filler, and from about 20 to about 500 parts by weight of a compound selected from the group consisting of substantially nonwater soluble fatty acids and fatty acid soaps, the whole being dispersed in a petroleum hydrocarbon solvent.

2. The anti-blemish paint of claim 1, wherein said filler is lamp black.

3. The anti-blemish paint of claim 1, wherein said fatty acid compound is stearic acid.

4. The anti-blemish paint of claim 1, wherein said petroleum solvent is gasoline.

5. An anti-blemish paint comprising 100 parts by weight of an elastomeric composition containing from about 75 to about 80 parts of synthetic cis-polyisoprene having from about 90% to about 95% content of isoprene radicals joined in a cis-configuration, and an intrinsic viscosity of from about 5.0 to about 10.0, from about 200 to about 300 parts by weight of lamp black, and from about 20 to about 50 parts by weight of stearic acid, the foregoing ingredients being dispersed in from about 1800 to about 2500 parts by weight of gasoline.

6. An anti-blemish paint for application to uncured rubber articles prior to the molding thereof comprising, as the solids portion thereof, 100 parts by weight of an elastomeric composition having, as its major constituent, synthetic cis-polyisoprene having from about 90% to about 95% content of isoprene radicals joined in a cis-configuration, from about 100 to about 500 parts by weight of a coarse filler, and from about 20 to about 500 parts by weight of a compound selected from the group consisting of substantially nonwater soluble fatty acids and fatty acid soaps.

7. A method of constructing tires having sidewalls with enhanced resistance to flex cracking which comprises applying an anti-blemish paint, comprising 100 parts by weight of an elastomeric composition having, as its major constituent, synthetic cis-polyisoprene having from about 85% to about 97% content of isoprene radicals joined in a cis-configuration, from about 100 to about 500 parts by weight of a coarse filler, and from about 20 to about 500 parts by weight of a compound selected from the group consisting of substantially nonwater soluble fatty acids and fatty acid soaps, the whole being dispersed in a petroleum hydrocarbon solvent, to the sidewall area of an uncured tire carcass, and molding and curing said carcass to form a tire.

8. A method of constructing tires having sidewalls with enhanced resistance to flex cracking which comprises applying an anti-blemish paint, comprising 100 parts by weight of an elastomeric composition containing from about 75 to about 80 parts of synthetic cis-polyisoprene having from about 90% to about 95% content of isoprene radicals joined in a cis-configuration, and an intrinsic viscosity of from about 5.0 to about 10.0, from about 200 to about 300 parts by weight of lamp black, and from about 20 to about 50 parts by weight of stearic acid, the foregoing ingredients being dispersed in from about 1800 to about 2500 parts by weight of gasoline, to the sidewall area of an uncured tire carcass, and molding and curing said carcass to form a tire.

9. A method of molding uncured rubber articles, wherein the trapping of air between the mold and the molded rubber article is minimized, which comprises applying the synthetic cis-polyisoprene anti-blemish paint of cliam 1 to the areas of the unmolded rubber article where air is normally trapped during molding as shown by the location of surface defects on previously molded articles not treated with said paint, and molding and curing to form a shaped rubber article.

References Cited in the file of this patent
UNITED STATES PATENTS

| | | |
|---|---|---|
| 1,295,594 | Price | Feb. 25, 1919 |
| 1,476,381 | Trumbull | Dec. 4, 1923 |
| 2,242,264 | Roberts | May 20, 1941 |
| 2,421,627 | LaCrosse | June 3, 1947 |
| 2,813,084 | Leistensuider | Nov. 12, 1957 |
| 2,989,513 | Hendry et al. | June 20, 1961 |